Oct. 29, 1946.                T. O. DAVIDSON ET AL                2,410,271
                              VARIABLE TREAD VEHICLE
                              Filed Feb. 1, 1945

Lawrence B. Schauer
Trevor O. Davidson
INVENTORS

BY Hoar & Ruhloff
ATTORNEYS.

Patented Oct. 29, 1946

2,410,271

UNITED STATES PATENT OFFICE 2,410,271

VARIABLE TREAD VEHICLE

Trevor O. Davidson, Milwaukee, Wis., and Lawrence B. Schauer, Los Angeles, Calif., assignors to Bucyrus-Erie Company, South Milwaukee, Wis., a corporation of Delaware Application February 1, 1945, Serial No. 575,660

6 Claims. (Cl. 180—9.1)

Our invention relates to new and useful improvements in variable tread vehicles, more particularly such vehicles for the purpose of carrying trench excavators of the Ruth type, so-called, such for example as shown and described in U. S. Patent No. 1,877,556, issued September 13, 1932, to Ary C. Clark et al., for improvements in Canal excavators.

Such machines consist of a main frame, usually with creeping traction mounting, and carrying the engine and excavating machinery; and an auxiliary frame, also usually mounted on creeping traction, and located on the outer end of an extensible outrigger, usually telescoping.

The object of this extensibility of the outrigger is so that the distance between the two creeping tractions can be adjusted so as to span the channel which is being dug or cleaned.

In the improved models of such a machine, the outrigger traction mechanism, as well as the main traction mechanism, is self-propelled. With such a machine, the easiest way to run the outrigger in and out, is by turning the outrigger unit at an angle, so that it will run in or out under its own power as the machine progresses along the ditch. Such is the case with the machine shown and described in the Clark patent, above referred to, and with the machine shown and described in U. S. Re. Patent No. 21,106, issued May 30, 1939, to Lawrence B. Schauer (one of the present patentees), for improvements in variable tread vehicles.

However, in the device of each of the above-mentioned two patents, the turning of the outrigger has to be accomplished by hand by rotating a hand-wheel or crank. Furthermore this hand steering has been found to be at the best very laborious, and at the worst practically impossible, depending on the condition of the ground on which the outrigger unit is resting. In some instances, the steering can be effected only by having one man walk alongside manipulating the steering wheel or handle, while another man runs the machine; but this expedient is manifestly impossible with one-man operation.

Of course, the turning could be effected by power, but this would require the additional expense of much additional machinery. In fact, even the hand-power turning apparatus involves some additional expense.

Accordingly the principal object of our invention is to provide an inexpensive means for steering the outrigger creeping traction unit without the use of either a hand-power steer or a power steer.

In addition to our principal object, above stated, we have worked out a number of novel and useful details, which will be readily evident as the description progresses.

Our invention consists in the novel parts and in the combination and arrangement thereof, which are defined in the appended claims, and of which one embodiment is exemplified in the accompanying drawing, which is hereinafter particularly described and explained.

Throughout the description, the same reference number is applied to the same member or to similar members.

Figure 3:
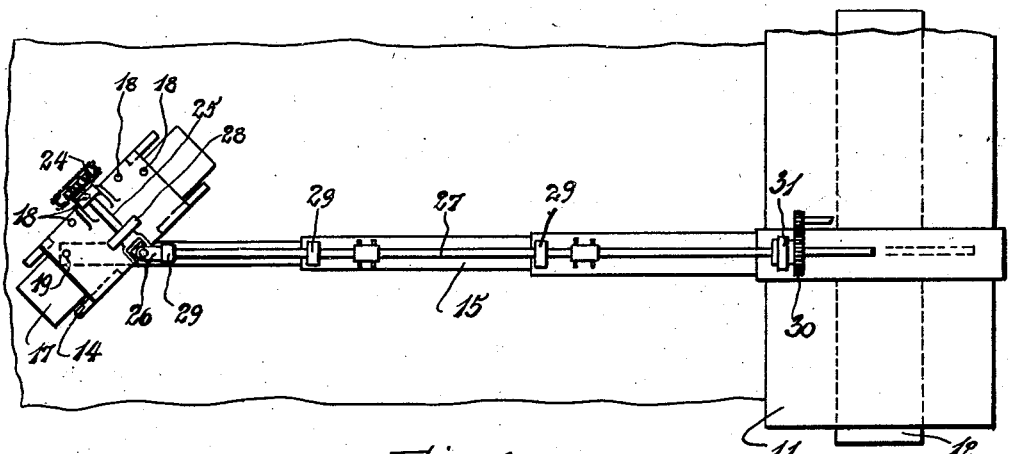
Figure 3 is the same as Figure 2, except that in Figure 3 our outrigger unit has been turned.

Referring now to all these figures, we see that 11 is the main frame of a trench excavator, supported on creeping traction mechanism 12, driven in any convenient manner by a main engine (not shown).

Across the ditch 13 from the main frame 11, there is an outrigger frame 14, connected to the main frame 11 by a telescoping beam 15, which may be of any convenient construction inasmuch as the details thereof constitute no part of our invention.

The outrigger frame 14 is connected to the telescoping beam 15 by a single pivot-pin 16, which must be definitely to one side of the center-line of the creeping traction mechanism 17 which supports the outrigger frame. The main engine, referred to earlier herein, is equipped with appropriate clutches and brakes and other mechanism (not shown), to control the relative speed of the two traction mechanisms 12 and 17.

On the deck of outrigger frame 14, on the side opposite from pivot 16, there are a series of holes 18, arranged in a circular arc about pivot 16 as a center. Beam 15 extends through outrigger frame 14 and has a hole 19 the same radial distance from pivot 16 as are holes 18. Below each of holes 18 and below the level of hole 19, there is a second series of registering holes 20.

Pivot 16 need not necessarily be on either side of outrigger frame 14, rather than the other, nor need holes 18, 19 and 20 be on the opposite side, provided only that holes 18, 19 and 20 are sufficiently spaced from pivot 16 to assure a firm non-pivoting attachment of outrigger frame 14 to beam 15.

Creeping traction mechanism 17 pivotally supports outrigger frame 14 through a combined drive-shaft and pivot 21. This shaft is driven by sprocket 22, which in turn is driven by sprocket-chain 23, which in turn is driven by sprocket 24, which in turn is driven by shaft 25, which in turn is driven by universal coupling 26, which in turn is driven by shaft 27.

Shaft 25 is supported by outrigger frame 14 in any convenient manner. As shown, it is supported by bearing-bracket 28.

Shaft 27 is supported by telescoping beam 15 in any convenient manner. As shown, it is supported by bearing-bracket 29.

Unless some alternative expedient be employed, it is essential that universal coupling 26 be almost exactly vertically aligned with pivot 16, and that shaft 27 be substantially in the same vertical plane as telescoping beam 15, although not necessarily above it.

For that matter, the whole mechanism for conveying power from the main frame to the outrigger frame could be eliminated, and some other and more direct means of driving creeping traction 17 could be employed, for example as shown in the Clark patent cited earlier herein, or it need not be driven at all, although preferably it should. Other forms of traction than creeping could likewise be employed. In the claims, when we refer to "traction support" we mean a mechanism having ground-engaging load-supporting ground-traversing potentialities, but not, necessarily implying capability for tractive effort, unless this is specifically called for by any given claim.

Our method of driving shaft 27 is as follows, although any other telescoping means could be employed. Gear 30 is journaled in bracket 31. The right hand end of shaft 27 is squared or otherwise keyed to fit slidably in the hub of gear 30. Gear 30 is then driven, in any convenient manner, by the main engine (not shown).

Figure 2:
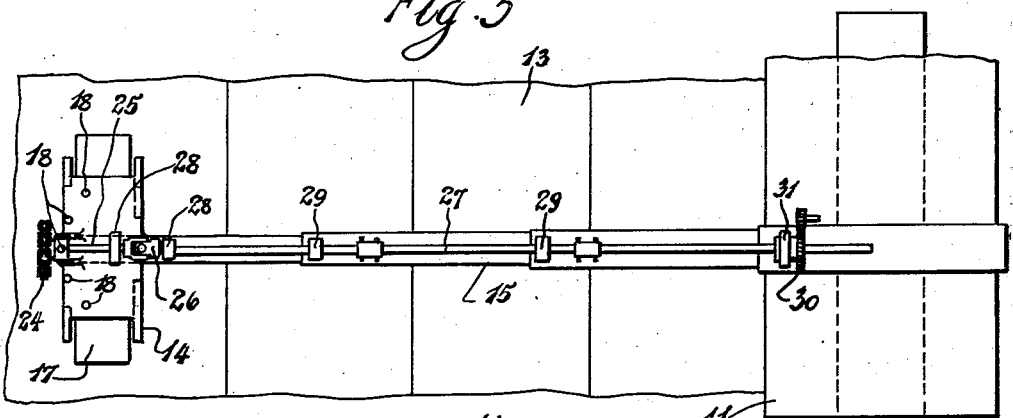
Figure 2 is a plan view of the same.
Figure 1:
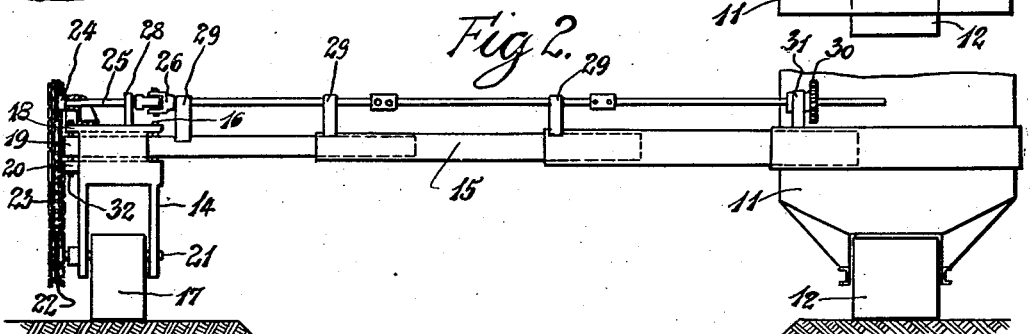
Figure 1 is a front elevation of a trench excavator embodying our invention. For simplification, all machinery, other than that involved in our invention, has been eliminated.

Normally outrigger frame 14 is locked (by pin 32, passing through hole 19, the central one of holes 18, and the corresponding one of holes 20, as in Figures 1 and 2) against pivoting with respect to beam 15.

When the operator desires to extend or contract beam 15, he removes pin 19. A very slight forward or backward propulsion of the machine will swing the outrigger frame (as, for example, shown in Figure 3), due to the offset location of pivot 16. Pin 32 can then be reinserted, thus locking the outrigger frame in its swung position.

Further propulsion of the machine in the appropriate direction will then extend or contract beam 15, whereupon outrigger frame 14 can be restored to parallelism with main frame 11, by a repetition of the maneuver first described.

If desired, means may be provided for locking beam 15 against further extension or contraction; but such means are not shown, as they do not constitute a part of our invention.

Having now described and illustrated one form of our invention, we wish it to be understood that our invention is not to be limited to the specific form or arrangement of parts herein described and shown.

We claim:

1. In a variable tread vehicle, the combination of: a main frame; a traction support therefor; an outrigger frame; a traction support therefor; means for driving the main traction; a telescoping beam connecting the two frames, the beam's means of connection to the outrigger frame comprising: a substantially vertical pivot offset from the center-line of the traction support of the outrigger frame; and a series of selective locking means spaced radially from the vertical pivot and spaced from each other angularly with respect to the pivot as a center, whereby the outrigger frame may be locked in various selective angular relations with respect to the beam, to permit the outrigger frame to be steered by unlocking the outrigger frame, then driving the main frame, and then locking the outrigger frame in its new angular position, the outrigger frame thus locked in new angular position serving to expand or contract the telescoping beam as the vehicle progresses.

2. A variable tread vehicle, according to claim 1, further characterized by the fact that the driving means for the main traction is located on the main frame, and has a driving connection with the outrigger traction, which driving connection comprises: a telescoping drive shaft in substantially the same vertical plane as the beam; a drive shaft on the outrigger frame; and a universal coupling between the two shafts, which coupling is located in substantial vertical alignment with the vertical pivot.

3. A variable tread vehicle, according to claim 1, further characterized by the fact that the selective locking means are arranged in a circular arc about the vertical pivot as a center.

4. A variable tread vehicle, according to claim 1, further characterized by the fact that the selective locking means comprise a substantially vertical hole in the beam, and a series of substantially vertical holes in the outrigger frame, all arranged in a circular arc about the vertical pivot as a center, and a pin for passing through the former hole and one of the latter holes when in register.

5. In a machine of the class described: a freely laterally extensible frame; means for supporting and propelling one side of the frame; similar means at the opposite lateral side of the frame; the latter means being shiftable laterally with the laterally extensible portion of the frame, and shiftable about a vertical axis angularly with respect to the longitudinal axis of the frame and the first propelling means; said frame being capable of being extended and contracted when said frame is propelled while the latter means is positioned angularly with respect to the frame; said vertical axis being offset from the center line of the second supporting means; and means for locking the second supporting means in angular relation to the extensible frame; whereby the second supporting means may be steered by unlocking it, then driving the first supporting means, and then locking the second supporting means in its new agnular position, the second supporting means thus locked in new angular position serving to expand or contract the laterally extensible portion as the vehicle progresses.

6. In a variable tread vehicle, having a main frame and an outboard traction support, and a laterally adjustable connecting means between the main frame and the outboard support; means providing a vertical axis offset from the center-line of the outboard support, about which said outboard support can be angularly adjusted with respect to the connecting means; and means for selectively locking said outboard support in a plurality of angularly adjusted positions; whereby the outboard support may be steered by unlocking it, then driving the outboard support, and then locking the outboard support in its new angular position, the outboard support thus serving to expand or contract the laterally adjustable connecting means as the vehicle progresses.

TREVOR O. DAVIDSON.
LAWRENCE B. SCHAUER.